United States Patent [19]
McDougall

[11] 3,930,818
[45] Jan. 6, 1976

[54] AIR CLEANER

[76] Inventor: Redford W. McDougall, 3265 Lucerne Way, Sparks, Nev. 89431

[22] Filed: Dec. 20, 1974

[21] Appl. No.: 534,677

[52] U.S. Cl. .................. 55/414; 55/467; 55/504; 415/219 C
[51] Int. Cl.² .......................................... B01D 31/00
[58] Field of Search ...... 55/417, 414, DIG. 29, 467, 55/470–473, 482, 487, 504; 98/121 R; 415/219 C

[56] References Cited
UNITED STATES PATENTS

| | | | |
|---|---|---|---|
| 2,085,159 | 6/1937 | Karmazin | 98/121 A |
| 2,152,447 | 3/1939 | Wheeler | 98/121 A |
| 2,808,124 | 10/1957 | Attwood | 55/473 |
| 3,629,999 | 12/1971 | March et al. | 55/473 |
| 3,715,972 | 2/1973 | Kelso et al. | 55/DIG. 29 |
| 3,791,113 | 2/1974 | Elder | 55/473 |

*Primary Examiner*—Bernard Nozick
*Attorney, Agent, or Firm*—Fitch, Even, Tabin & Luedeka

[57] ABSTRACT

An air cleaner is described for removing airborne contaminants in a room. The air cleaner includes a housing defining a linearly elongated duct in which is mounted, in stated order, a low efficiency filter, a high efficiency filter, and a blower. Suitable baffling is mounted to the housing to isolate the intake and discharge orifices of the blower and the blower is oriented to discharge air from the duct in a direction substantially coinciding with the direction of flow of air through the duct.

3 Claims, 3 Drawing Figures

AIR CLEANER

This invention relates generally to air cleaners and, more particularly, to an improved air cleaner for removing airborne contaminants in a room.

Many and varied designs for air cleaners have been developed. These designs include units which are either portable or adapted to be mounted in a room and which are self-contained in that they do not employ external ducting such as an existing forced-air furnace or cooling system. Typically, such self-contained units employ some type of filter arrangement, such as an electrostatic filter or a forced-air filter with associated blower units.

Air cleaners employing forced-air filters and associated blowers are sometimes preferable over electrostatic type air cleaners because of their lower cost, easier installation and maintenance, and higher capacity. Nevertheless, air cleaners utilizing forced air filters and associated blowers and employing prior art designs have often suffered from certain deficiencies. Among these deficiencies is an inability to process large amounts of highly contaminated air, such as may be present in bars, restaurants, and other commercial establishments where relatively large amounts of people congregate and where large amounts of dust and cigarette smoke are present. Typical prior art units have often been unable to cope with highly contaminated air either because of inherent high resistance to air flow or because air circulation in the room itself is improper, such as short circuiting from the output to the input of the air cleaning unit. Prior art devices often have had a tendency to clog quickly, contributing to a further reduction of efficiency in the use of power for operating the device. Often such prior art units have also been difficult to service in that access to the filters for cleaning or replacing has been inconvenient.

It is an object of the present invention to provide an improved air cleaner for removing airborne contaminants in a room.

Another object of the invention is to provide an air cleaner of simple construction and which is therefore easily manufactured and readily serviced.

A further object of the invention is to provide an air cleaner which is low in cost and which can process a very high volume of air in relation to its size.

A further object of the invention is to provide an improved room air cleaner of high efficiency which is capable of circulating the air around the room in a vigorous manner and with a definite path.

Other objects of the invention will become apparent to those skilled in the art from the following description, taken in connection with the accompanying drawings wherein.

Figure 1:
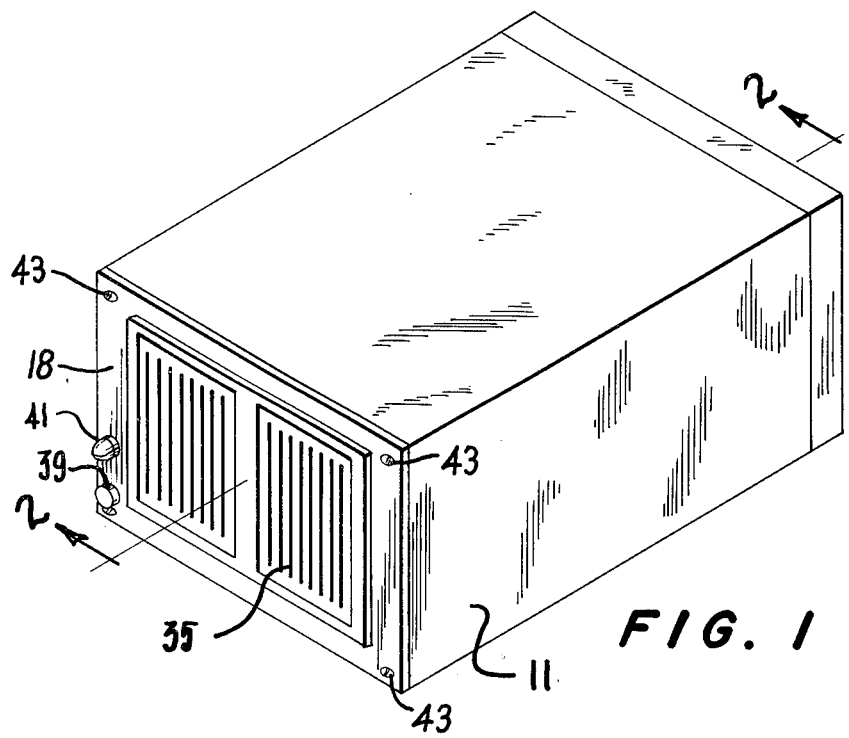
FIG. 1 is a perspective view of an air cleaner constructed in accordance with the invention.
Figure 2:
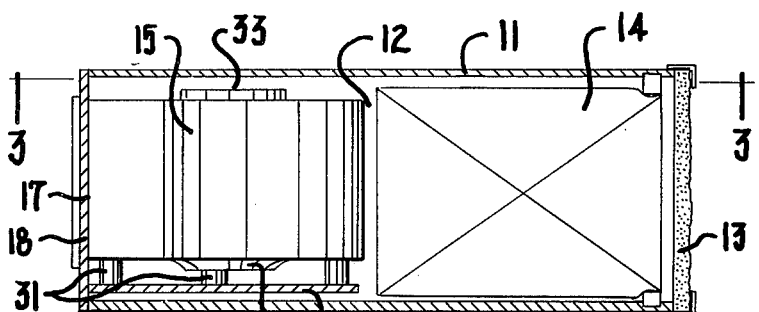
FIG. 2 is a sectional view of the air cleaner of FIG. 1 taken on a vertical plane through the line 2—2 of FIG. 1.
Figure 3:
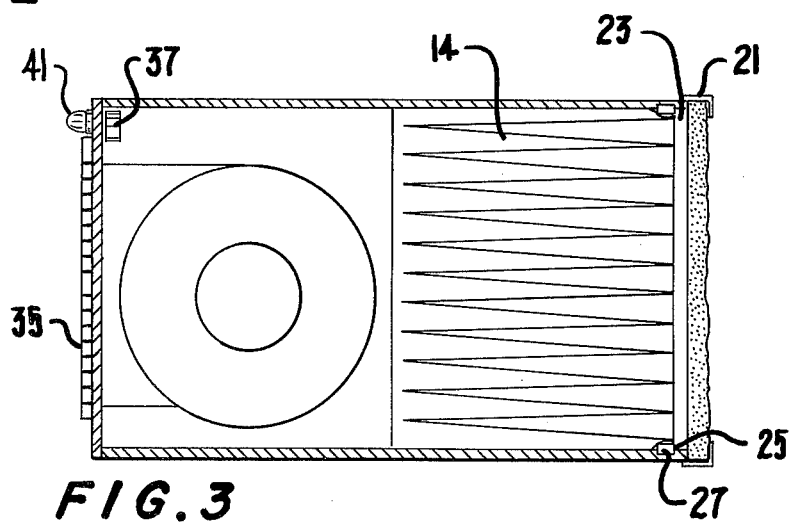
FIG. 3 is a sectional view taken along the line 3—3 of FIG. 2.

Very generally, the air cleaner of the invention comprises a housing 11 defining a linearly elongated duct 12. A low efficiency filter 13 is mounted spanning the duct at one end thereof and a high efficiency filter 14 spans the duct immediately adjacent the low efficiency filter on the side of the low efficiency filter toward the opposite end of the duct 12 from the end at which the low efficiency filter is mounted. A blower 15 is mounted within the duct on the side of the high efficiency filter opposite the low efficiency filter. The blower has an intake orifice 16 and a discharge orifice 17. Baffle means 18 mounted on the housing 11 isolate the intake and discharge orifices of the blower. The dishcarge orifice of the blower is oriented to discharge air from the duct 12 in a direction substantially coinciding with the direction of flow of air through the duct.

Referring now in greater detail to the drawings, a particular embodiment of the invention is illustrated. The illustrated embodiment comprises a housing 11 which is in the shape of a rectangular parallelepiped forming a linearly elongated duct 12 of substantially rectangular cross section. The walls forming the housing 11 may be of any suitable material such as plywood or aluminum sheet. Plywood having a polyester woodgrain coating or a vinyl covering has been successfully used. The walls of the housing are suitably secured at the corners by means not shown.

The low efficiency filter 13 may be of any suitable type generally known to those skilled in the art as low efficiency filters. Such filters typically comprise a plurality of fibers such as glass fibers woven together and typically provide an efficiency of between about 8 and about 12 percent by the ASHRAE Discoloration Test Method (Standard 52–68). Other low efficiency filters such as metal screen and foam types of filters may also be used. The purpose of the filter 13 is to filter out large particles in the air being cleaned, such as particles of dust and pollen. The filter 13 may or may not be provided with a rigid outer frame, not shown, of cardboard or aluminum, and is held in place at one end of the housing 11 by means of a rectangular frame 21 of L-shaped cross section. The frame 21 extends inward a short distance about the periphery of the filter 13 to secure the filter against displacement away from the housing 11, and is suitably mounted to the housing by means, not shown.

A second filter 14, of the type generally known to those skilled in the art as a high efficiency filter, is mounted within the housing 11 in the duct 12. The filter 14 spans the duct immediately adjacent the low efficiency filter 13 on the side of the low efficiency filter toward the opposite end of the duct from the end at which the low efficiency filter is mounted. The high efficiency filter 14 illustrated is of the pleated type known in the art and available from the Cambridge Filter Company under the trade name "Hi-Flo" filter. By high efficiency it is meant that the efficiency of the filter is between about 93 and about 97 percent as measured by the ASHRAE Discoloration Test Method (Standard 52–68). The tests referred to herein are designated by the ASHRAE standards numbered 52 through 68.

The filter 14 is provided with a peripheral metal mounting frame 23 at one end thereof. A shoulder 25 is provided on the interior of the housing 11 by means of a peripheral structural strip 27 mounted on the interior walls of the housing. The shoulder 25 faces toward the filter 13 and provides a surface against which the frame 23 of the filter 14 abuts. During operation of the air cleaner of the invention, described below, the air pressure is such as to force the frame 23 against the shoulder 25 and thereby effect a peripheral seal about the filter 14 to prevent contaminated air from bypassing the filter 14.

The blower 15 is of the centrifugal type and is mounted within the duct 12 on the opposite side of the filter 14 from the filter 13. The blower 15 is supported on a support plate 29 and is spaced from the support plate by a plurality of mounting spacers 31. The intake duct 16 is located on the axis thereof on the underside of the blower and the blower is driven by means of a suitable motor 33. The motor 33 may be of the ball bearing type and rotates the centrifugal blower 15, as is known in the art, to discharge air through the discharge orifice 17. By mounting the blower such that the axis is perpendicular to the larger dimension of the rectangular cross section duct 12, a larger wheel diameter may be accommodated within the duct allowing more air to be pumped with fewer revolutions per minute. The result is that less noise is generated per revolution and the air exits in a substantially horizontal plane.

In order to isolate the intake orifice 16 from the discharge orifice 17, the baffle means 18 are provided. In the illustrated embodiment, the baffle means comprise a baffle plate which extends across the mouth of the duct 12 at the opposite end of the housing 11 from the filter 13. The baffle plate has a suitable opening therein aligned with the discharge orifice of the blower 15. Diffusion and regulation of the direction in which air is discharged from the air cleaner is provided by a suitable directional grill 35.

The motor 33 is of the variable speed type and is controlled by a suitable speed control 37 mounted to the panel 18. A knob 39 allows for manual regulation of the speed of the blower and the control 37 may also be provided with an on-off feature to turn the air cleaner completely off. An operating light 41 may also be provided on the front panel to indicate whether the unit is turned on or off.

By attaching the metal strip or frame 21 to the housing 11 by means of holding clips, not shown, the trim may be readily removed to change the prefilter or low efficiency filter 13 when such becomes necessary. Access to the filter 14 is achieved by removing the metal frame 21 and the low efficiency filter 13. The filter 14 may then be slipped out of the open end of the duct 12 for replacement.

Access to the blower 15 and motor 33 is achieved by removing suitable screws 43 retaining the front panel 18 in place. The front panel, the grill 35, the blower support 29, the blower 15 and the motor 33 are all secured together as a unit and may then be slipped out of the housing 11 as a single assembly.

The air cleaner of the invention effectively removes dust, pollen and smoke from the air in a room and may be successfully utilized in places of high contamination such as bars and restaurants. The straight through linear design of the air cleaner circulates the air around the room vigorously to ensure that all of the air in the room is processed. Contaminants are therefore passed through the filter immediately after they are generated, resulting in a clean contaminant-free atmosphere. The unit may be readily hung from a ceiling or mounted to the wall as a permanent fixture in the room. By passing the air first through the filters and then into the blower, clogging and contamination of the blower is minimized. Short circuiting of air from inlet to outlet is avoided by the discharge and intake alignment and the unit is readily serviced.

An air cleaner constructed in accordance with the invention utilizing panels of ⅝ inch thick plywood for the walls of the housing 11, and using an overall dimension of 40 × 16 × 24 inches is capable of processing 1,600 cubic feet per minute of air using a motor developing one-third horsepower. Under these conditions, the unit processes 180 cubic feet per minute of air per cubic foot of air cleaner volume.

Various modifications of the invention in addition to those shown and described herein will become apparent to those skilled in the art from the foregoing description and accompanying drawings. Such modifications are intended to fall within the scope of the appended claims.

What is claimed is:

1. An air cleaner for removing airborne contaminants in a room, comprising, a housing adapted to be hung from a ceiling or mounted to a wall and defining a linearly elongated duct of rectangular cross section, a low efficiency filter mounted spanning said duct at one end thereof, a high efficiency filter mounted spanning said duct on the side of said low efficiency filter toward the opposite end of said duct from the end at which said low efficiency filter is mounted, said high efficiency filter having an efficiency of at least about 93 percent of the ASHRAE Discoloration Test Method (Standard 52–68), a centrifugal blower mounted within said duct on the side of said high efficiency filter opposite said low efficiency filter, said blower having an axis of rotation which is perpendicular to the direction of elongation of said housing and having intake and discharge orifices, baffle means mounted to said housing for isolating said intake and discharge orifices of said blower, said baffle means including a substantially planar panel closing said duct at the end thereof opposite said low efficiency filter and having an orifice therein, means detachably securing said panel to said duct, said blower having said discharge orifice engaging said panel at said panel orifice through which said discharge orifice of said blower discharges in a direction substantially coinciding with the direction of flow of air through said duct, a directional air diffuser mounted across the path of discharge of said blower, and means mounting said blower and said air diffuser to said panel for removal therewith as a unit from said housing.

2. An air cleaner according to claim 1 wherein said housing includes a shoulder extending about said duct adjacent the periphery of said high efficiency filter, and wherein said high efficiency filter has a mounting frame, said shoulder having a surface engaging said mounting frame of said high efficiency filter on the side thereof toward said blower.

3. An air cleaner according to claim 1 wherein said mounting means comprise a support plate secured to said panel, and means securing said blower to said support plate, said support plate being removable with said panel.

* * * * *